UNITED STATES PATENT OFFICE 2,079,514

METHOD FOR TREATING SEA-OOZE

Wilhelm Leetz, Zerbst, Germany

No Drawing. Application November 21, 1934, Serial No. 754,179. In Denmark August 20, 1934

2 Claims. (Cl. 34—24)

The invention concerns a method for treating sea-ooze, which is a material found at the mouths of rivers and at the coasts of seas and oceans, sea-ooze consisting of plants which contain substances for amelioration in agriculture and for other purposes. Mud, and especially sea-ooze has frequently been utilized for the purpose of ameliorating soil. The depriving of water up to a percentage of 45–50%, which is necessary in this case, is, however effected in such a complicated and incomplete manner that it is hardly possible to make practical use of ooze as manure. Furthermore, ooze that has been treated according to the methods known up to now, is turned out in very large pieces only, so that it is not possible to attain complete touch and connection between all particles of ooze and the soil.

It is the purpose of this invention to provide a method by means of which the ooze is dried and made into small pieces to such an extent that it may, similar to any other artificial manure, be applied to the soil to be manured in finely dispersed condition by means of dung-dispersing machines and the like. This purpose is attained by subjecting the ooze in closed rooms or containers to a drying-process, after which it is exposed to freezing-temperature because of the particles of water it still contains, after which a renewed drying-process is applied by heating, so that the dried ooze falls to pieces owing to the freezing of the remaining particles of water, and assumes a pulverized form after evaporation of the still remaining particles of water.

By means of the drying-process which takes place in the interior of closed rooms or containers, evaporation of the particles of water and simultaneously a sinking of the temperature in the interior below the outer temperature is caused. It is possible to register the temperatures inside as well as outside these rooms or containers by means of measuring devices, such as thermometers, which are visible from the outside. By the degree of assimilation of interior temperature to the outside temperature, it is possible to judge to what extent the process of drying the ooze has progressed. After having attained the desired degree of dryness, such low temperatures are created in the interior of the rooms or containers by means of well-known refrigerating-devices such as by leading in liquid air and causing the same to evaporate in the interior, that the still remaining particles of water freeze in the ooze, thereby causing the same to fall to pieces, so that the ooze is separated into small particles without the help of any mechanical devices. By means of a subsequent process of rewarming, the ooze is subjected to a further process of drying, as the remainder of particles of water evaporate, so that, in the end, it adopts a finely distributed pulverized form.

The process of drying the ooze is suitably effected in such a manner that the ooze is exposed to a draught of air within the closed room or container, which causes the particles of water to evaporate and the ooze to dry. The process of freezing may be brought about by any of the well-known methods of refrigeration. The subsequent process of rewarming and renewed drying of the pulverized ooze is suitably effected by means of the heat of the sun or with the help or artificial heating-devices such as stove-heating, steam-heating, warm-water heating or the like. According to the quality of the ooze to be treated, or according to the qualities the ooze is desired to possess after having been treated, the separate stages may be repeated either each separately or together, once or several times. The ooze treated in this manner may also be put through a strainer, or may be separated into equal and small particles or pulverized by grinding-machines or other devices for the purpose of breaking it up into small pieces. If the ooze is then to be used as manure, it is possible, when in this form to strew it very easily onto the soil by hand or by means of strewing-devices. The ooze which has been dried in the manner described may easily be pressed into shapes and burnt in order to be used as stones, for building, warmth-insulating-material or the like. If used as stones, for building it is fire-proof. Before being pressed and burnt, it should preferably be mixed with a suitable binding medium. The method described may be adapted to each special case in practice, in which case several details may be changed without hereby deviating from the scope of the invention.

What I claim is:

1. A method for the treatment of ooze, seaweed or the like, characterized by the fact that in the interior of closed rooms or containers the ooze is subjected to a draft of air to effect drying, then refrigerating the ooze to freeze particles of water therein, then melting the ooze and again subjecting it to a draft of air, whereby the ooze is caused to disintegrate in small pieces and to assume a substantially pulverized form after evaporation of the remainder of the particles of water by the draft of air has taken place.

2. A method for the treatment of ooze, characterized by the fact that in the interior of closed rooms or containers, the ooze is subjected to a draft of air to effect drying, then refrigerating the ooze to freeze particles of water therein, then melting the ooze by the application of heat and by again drying it by subjecting it to a draft of air so that the dried ooze is caused to disintegrate and to assume a substantially pulverized form after evaporation of the remainder of the particles of water has taken place.

WILHELM LEETZ.